United States Patent [19]

Lamparter

[11] Patent Number: 4,895,065
[45] Date of Patent: Jan. 23, 1990

[54] COMBINED STATIC AND POWERED VENT DEVICE

[75] Inventor: Ronald C. Lamparter, Grosse Pointe Shores, Mich.

[73] Assignee: Transpec Inc., Troy, Mich.

[21] Appl. No.: 261,592

[22] Filed: Oct. 24, 1988

[51] Int. Cl.⁴ ............................................. B60H 1/26
[52] U.S. Cl. ..................................... 98/2.14; 98/2.18
[58] Field of Search .................. 78/2.14, 2.18, 42.02, 78/42.07, 42.11

[56] References Cited

U.S. PATENT DOCUMENTS

| | | | |
|---|---|---|---|
| 1,983,979 | 12/1934 | Graham | 98/2.14 |
| 2,550,353 | 4/1951 | Hopfinger | 98/2.14 |
| 3,867,486 | 2/1975 | Nagele | 98/2.14 X |
| 4,307,655 | 12/1981 | Parks et al. | 98/2.14 |
| 4,592,269 | 6/1986 | Lamparter | 98/2.14 |
| 4,633,769 | 1/1987 | Milks | 98/2.14 X |

FOREIGN PATENT DOCUMENTS

| | | | |
|---|---|---|---|
| 3003224 | 8/1981 | Fed. Rep. of Germany | 98/2.14 |
| 38109 | 3/1984 | Japan | 98/2.14 |

Primary Examiner—Harold Joyce

[57] ABSTRACT

A combined static and powered vent device for a vehicle such as a bus wherein the interior of the vehicle is continuously vented to the atmosphere in such a way that the forward movement of the bus causes an eductive drawing of the air from the vehicle interior and which also includes a powered fan device for venting the vehicle interior when static or eductive venting is inadequate.

1 Claim, 4 Drawing Sheets

COMBINED STATIC AND POWERED VENT DEVICE

TECHNICAL FIELD

It is required by law in many states that commercial vehicles such as buses include a static vent system whereby the passenger compartment is at all times vented to the atmosphere. The purpose of such a static vent system is to ensure that potentially noxious vapors have a way of being vented from the interior of the vehicle. Such a static system is particularly intended to draw ventilating air through the vehicle passenger compartment and exhaust the same as the vehicle is moving.

It is found that where a vehicle such as a bus is not moving or has been sitting for a period of time in the sunshine, the interior of the vehicle becomes extremely warm and is not substantially relieved of such heat by a static vent system. Accordingly, such vehicles sometimes incorporate powered systems such as electric fans to draw heated air from the interior of the vehicle.

It is the purpose of the present invention to provide a unique combined static and powered vent device for a vehicle. In this way the ventilation system is such that when the vehicle is stationary or static venting is inadequate, the powered device draws air from the vehicle interior and exhausts the same to the atmosphere while at the same time providing a static eductive vent device which functions when the vehicle is moving forwardly.

BACKGROUND ART

Applicant's earlier U.S. Pat. No. 4,592,269 entitled "Static Vent Device" is relevant to the static venting aspect of the present invention. Applicant is unaware of any prior art disclosing his combined static and powered vent device. As with applicant's earlier device, it is preferred that the subject invention be incorporated in a combined vent and escape hatch mechanism such as shown in U.S. Pat. No. 4,021,073—Manning. It is to be understood, however, that the subject invention may be utilized in a vehicle without incorporating the same in the aforementioned Manning escape hatch device.

DISCLOSURE OF THE INVENTION

A static vent system for a vehicle has the primary function of providing a continuous venting of the interior or passenger compartment of the vehicle to the atmosphere with the particular emphasis on preventing the build-up or accumulation of noxious or unhealthy vapors in the passenger compartment. Such systems normally have a limited venting capacity and are, therefore, intended to be most effective during the forward movement of the vehicle which causes an eduction or evacuating effect to draw air through the passenger compartment. Prior to my previously noted patent, there had been several inherent problems with such static devices. First, if the vent system projects substantially above the vehicle roof structure, undesirable aerodynamic drag will be created reducing the operating efficiency of the vehicle. A secondary aspect of the first mentioned problem is an aesthetically unpleasing appearance. Both my prior patented device and the subject device have been designed in such a way as to provide a very streamlined or airflow efficient design which also creates a strong eductive force when the vehicle is moving forwardly. An ever present problem with any roof mounted venting system is to prevent the ingress of water into the vehicle passenger compartment.

In the present invention, applicant has uniquely designed a powered device, such as an electric fan, as to be incorporated in a static vent device in such a way as not to interfere with the functioning of the static vent device and also maintaining a streamlined device to minimize aerodynamic drag.

As noted, the subject invention may be incorporated into a manually operable combined vent and escape hatch mechanism as shown in Manning U.S. Pat. No. 4,021,073. However, when reference hereinafter is made to a vehicle roof panel, such panel may either be the roof of the vehicle itself, a panel substituted for a section of the roof or the panel of an escape hatch mechanism as shown in the Manning patent.

The combined static and powered vent device of the subject invention is adapted to be disposed in the roof of a vehicle such as a bus. The device comprises a panel member having vertically spaced upper and lower walls with the upper wall being outside the vehicle and the lower wall being within or adjacent the vehicle compartment. The panel members include vertically aligned openings for venting the vehicle interior to the outside atmosphere. The upper panel wall includes baffle means formed thereon and projecting vertically above the upper panel wall for the purpose of diverting water from the panel openings. Powered means, such as an electric fan, is mounted upon said panel and is generally disposed between the upper and lower panel walls in such a way that the fan is adapted when energized to force air to flow through the panel openings to exhaust the vehicle interior air. A domed cover member is mounted upon the upper panel wall and encloses the wall openings and the baffle means. The cover includes a rear wall facing the rear of the vehicle. Vent openings are formed in said cover wall. The cover and the baffle means coact to define passages through which air may flow from the interior of the vehicle and be expelled through the vent cover openings either by the electric fan, by the eductive effect of air flowing over the domed cover, or convective air flow if the vehicle is stationary and the fan inoperative.

The baffle means includes a first planar portion surrounding the upper panel opening and is elevated above the upper panel wall to provide a first barrier against water flowing into the panel openings. The baffle means includes a baffle segment which projects upwardly from the planar portion and extends generally around the rear half circumference of the upper panel opening. The upper surface of the baffle segment is abuttingly engaged by the domed cover whereby the segment and cover coact to block the passage of water into the panel openings and which water may be above the first barrier level.

The domed cover projects laterally beyond the panel openings and baffle segment and coacts with such segment to define air passages communicating the cover vent opening with the panel openings. Finally, the upper panel wall is provided with transverse and longitudinally extending ribs to support the generally planar upper wall of the dome.

The advantages of applicant's invention will be more clearly understood and appreciated from the following detailed description and accompanying drawings.

BEST MODE FOR CARRYING OUT THE INVENTION

Figure 6:
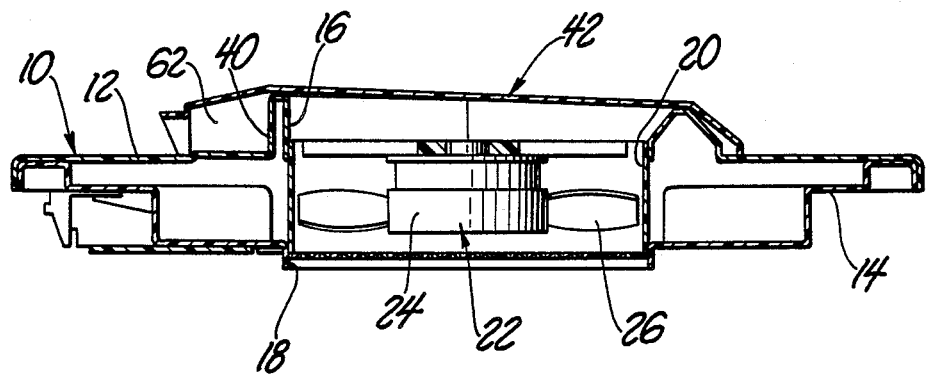
FIG. 6 is a sectional view along line 6—6 of FIG. 5.

As earlier indicated, the vent device may be incorporated into a panel adapted to be fixed in a vehicle roof or it may be incorporated in the hatch of a combined vent and escape mechanism as shown in U.S. Pat. No. 4,021,073—Manning. Since it is preferred to be incorporated in the combined vent and escape hatch mechanism, the hatch for such mechanism is indicated generally at 10. The hatch or panel 10 includes an outer wall 12 and an inner wall 14 as best seen in FIG. 6. The outer and inner walls 12 and 14 include concentric openings 16 and 18 which are vertically spaced and adapted to receive a circular collar 20. Collar 20 is suitably secured within the upper and lower wall openings as by adhesion. Thus, upper and lower panel openings 16 and 18 along with the cylindrical collar 20 define an air passage adapted to openly communicate the interior of the vehicle with the outside atmosphere.

Figure 2:
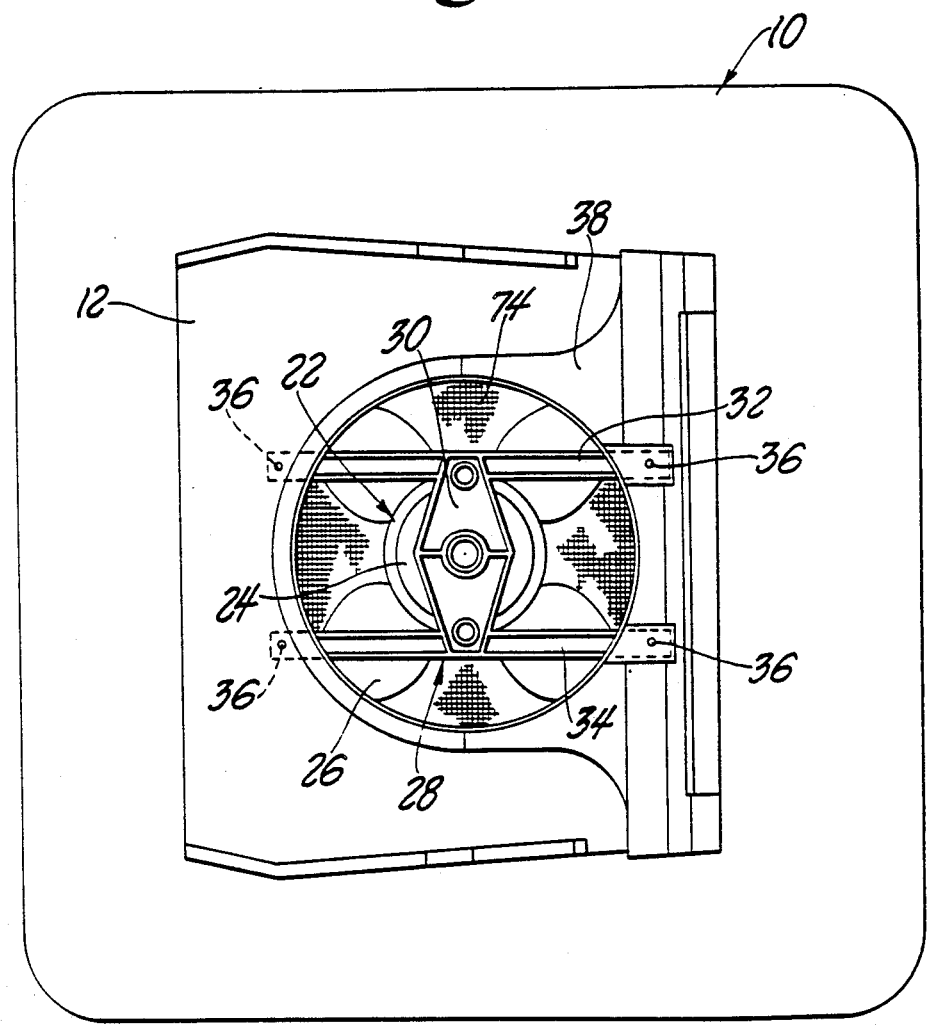
FIG. 2 is a plan view along lines 2—2 of FIG. 1.
Figure 4:
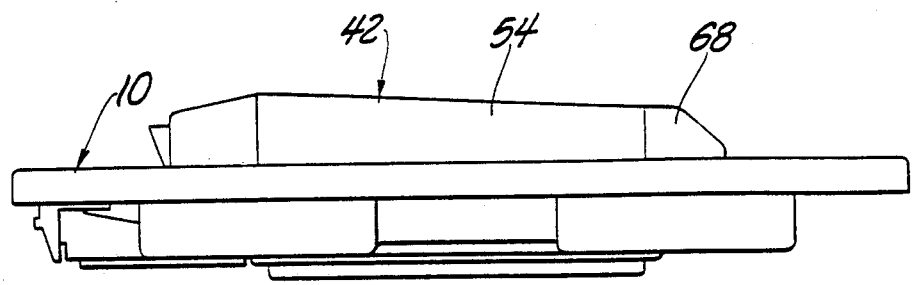
FIG. 4 is a side elevation of the vent device with the domed cover in place.
Figure 3:
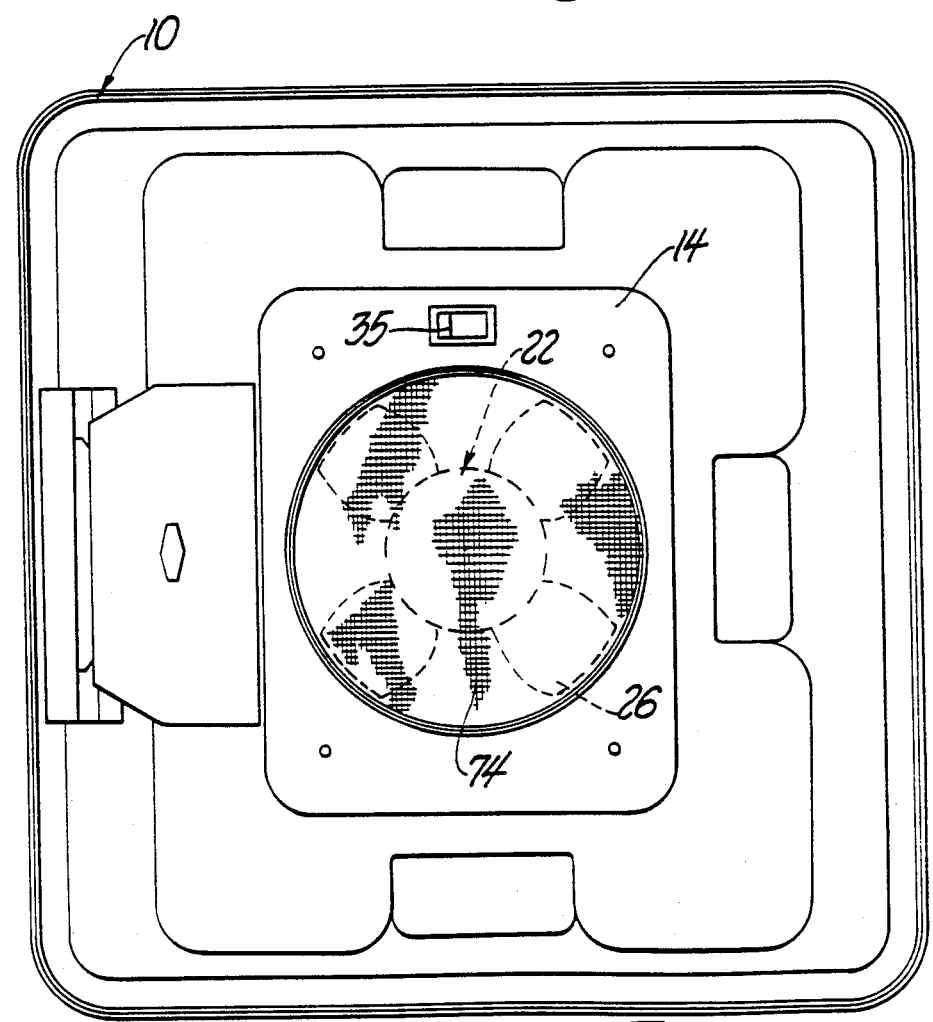
FIG. 3 is a bottom view along lines 3—3 of FIG. 1.
Figure 5:
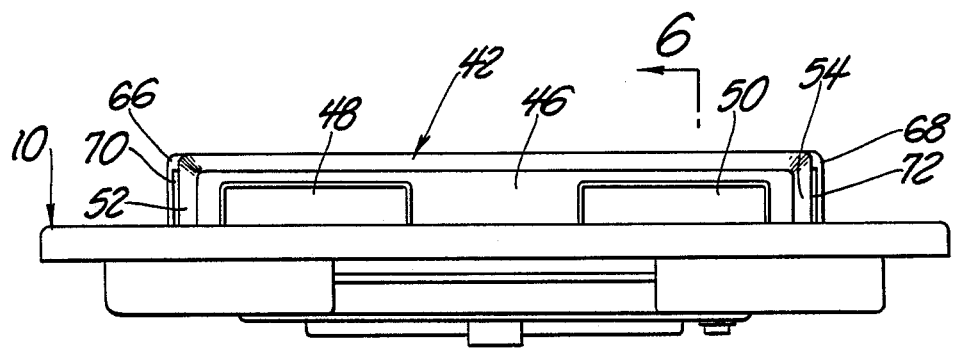
FIG. 5 is a rear elevation view along lines 5—5 of FIG. 4.
Figure 7:
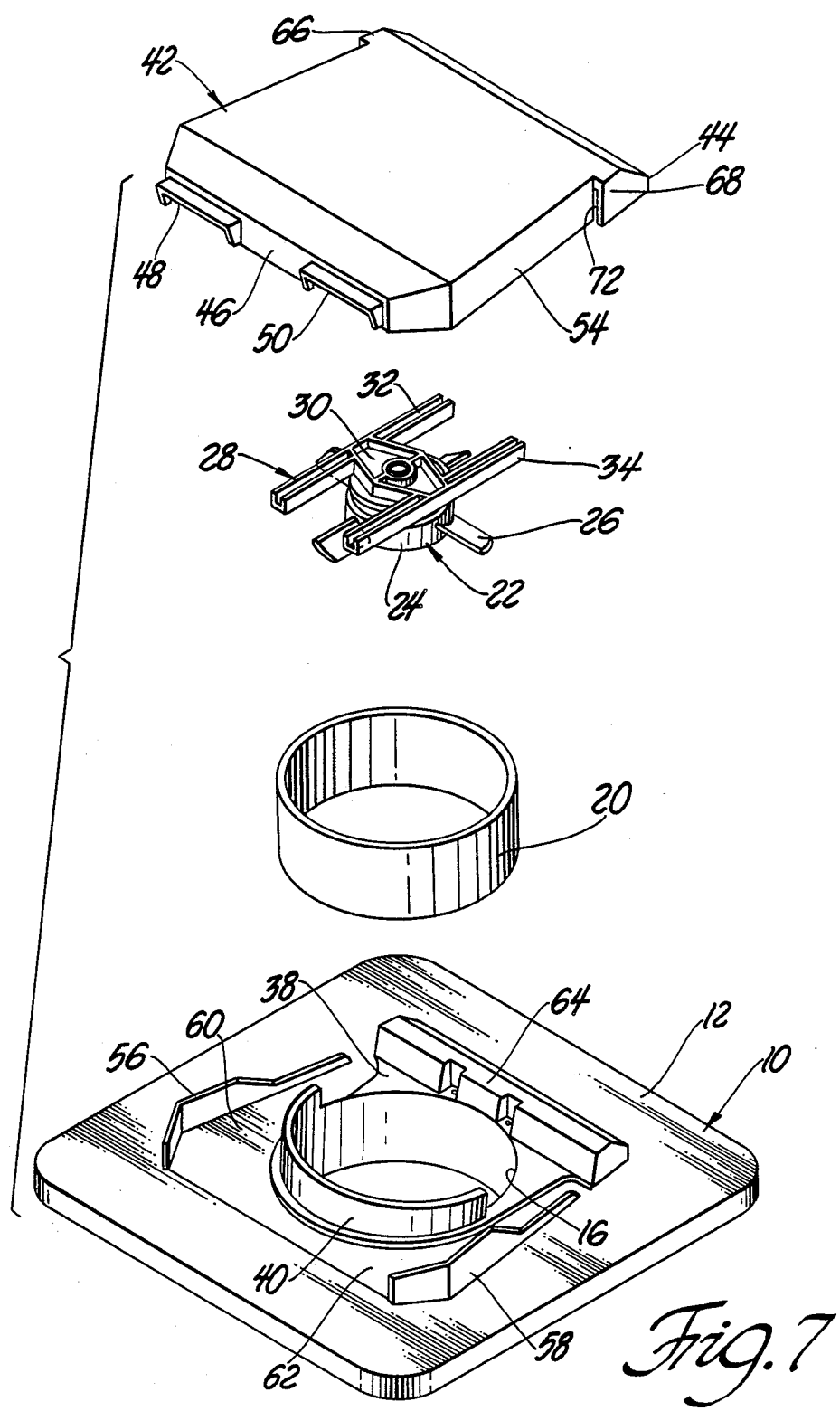
FIG. 7 is an exploded view of the vent device with the various components thereof disassembled.

An electric motor driven fan assembly is indicated at 22 and includes an electric motor 24 and a bladed impeller 26. As best seen in FIGS. 2, 6 and 7, the fan assembly 22 is supported within circular collar 20 by a bracket mechanism indicated generally at 28. Bracket assembly 28 includes a transverse bracket element 30 which is either integral with or fixed to longitudinal rails 32 and 34. As best seen in FIG. 2, rails 32 and 34 are suitably fixed to upper panel wall 12 through suitable screws or other fasteners 36.

A suitable switch mechanism 35, is conveniently located within the vehicle to energize the fan assembly when it is desired to force air out of the vehicle compartment. Switch 35 is shown mounted on inner panel wall 14 but may be located in any other convenient location as on the vehicle instrument panel.

As best viewed in FIGS. 2 and 7, upper panel wall 12 includes a raised planar portion 38 which provides a first edge or barrier to the unwanted ingress of water into the passenger compartment.

Upper panel wall 12 includes a further elevated portion extending above the first elevated portion 38 to provide a generally hemispherical barrier portion 40 disposed around the rear most hemispherical portion of the upper wall opening 16.

Domed cover 42 is best viewed in FIGS. 6 and 7. The cover includes downwardly sloping front and rear walls 44 and 46. In this case front and rear refer to the directions relative to the front and the rear of the vehicle. In other words, when the vehicle is moving forwardly, cover wall 44 faces into the air movement whereas rear wall 46 faces away from the air movement. Whereas cover wall 44 is continuous and is adapted to transversely seat upon upper panel wall 12, rear wall 46 includes a pair of transversely spaced openings 48 and 50. Cover 4 also includes side walls 52 and 54 which seat upon upper panel wall 12.

Figure 1:
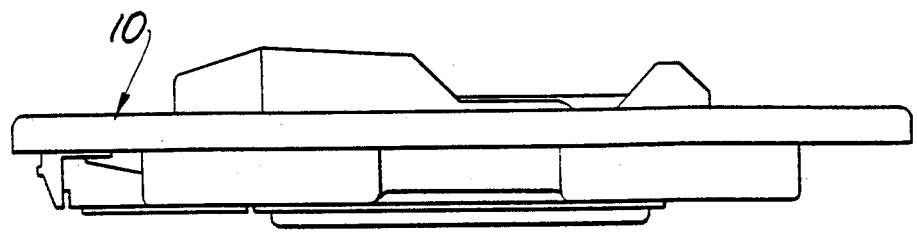
FIG. 1 is a side elevation of the static vent device with the domed cover removed.

Referring particularly to FIGS. 1 and 7, upper panel 12 is also formed to provide a pair of generally longitudinally extending cover support ribs 56 and 58. The highest portions of ribs 56 and 58 are the same height as barrier portion 40 against which the top of cover 42 seats so as to define air passages 60 and 62. Since the panel barrier 40 only extends around the rear half circumference of upper panel opening 16, air may be drawn or otherwise flow from the vehicle compartment upwardly through cylindrical sleeve 20 and be evacuated through side air passages 60 and 62 and through cover openings 48 and 50.

Upper panel wall 12 also includes a transverse rib 64 located forwardly of opening 16 and is also adapted to provide support for the front portion of cover 42.

Thus, the normal flow of air, whether by eduction, fan power or convection, is from the interior of the vehicle upwardly through the opening defined by collar 20 forwardly around the panel barrier 40 to be exhausted through air passages 60 and 62 and cover openings 48 and 50. Most normally, water would tend to enter through the air exhaust passages only when the vehicle was stationary. Under normal rain conditions, water is prevented from entering the interior of the vehicle because of the elevated planar portion 38 of the panel as well as from blowing directly into the vehicle by panel barrier 40. To facilitate the elimination of any water that should collect upon upper panel wall 12 and within cover 42, the forward side portions of cover 42 are laterally or transversely extended to provide side extensions 66 and 68. The rear facing walls of extensions 66 and 68 include slots 70 and 72 through which water within the cover can drain out or be sucked out when the vehicle is moving forwardly.

A screen 74 is suitably mounted in the bottom or inner end of cylindrical collar 20 to prevent the intrusion of insects and the like into the passenger compartment.

Other modifications of the invention are comprehended within the scope of the hereinafter appended claims.

I claim:

1. A combined static and powered vent device adapted to be disposed in the roof of a vehicle said device comprising:
   A. panel (10) having
      (1) vertically spaced upper and lower walls (12 and 14),
      (2) aligned openings (16 and 18) formed in said panel walls for venting the vehicle interior to the outside atmosphere,
      (3) baffle means (38–40) formed on and projecting vertically above the upper panel wall (12) for diverting water from said panel openings;
   B. motor-fan means (22) mounted in said panel and generally disposed between said upper and lower walls (12 and 14), said fan means being adapted to force air to flow through the panel openings to exhaust vehicle interior air; and
   C. a domed cover member (42) mounted upon the upper panel wall (12) and enclosing said wall openings and said baffle means, said cover including a rear wall (46) facing the rear of the vehicle, vent openings (48-50) formed in said rear wall, said cover (42) and said baffle means (38–40) coacting to define passages (60-62) through which air may flow from the interior of the vehicle and be expelled through said cover vent openings (48-50); said baffle means includes a first planar portion (38) surrounding said panel opening (16), said portion being parallel to and elevated above the upper panel wall (12) to provide a first barrier against water flowing into said panel openings, a baffle segment (40) projecting upwardly from said planar portion (38) and extending generally around the rear half circumference of the upper panel opening (16), the upper surface of the baffle segment (40) abuttingly engaging the dome cover (42) whereby the segment and cover block the passage of water into the panel openings; the upper panel wall (12) includes a first raised dome-supporting rib (64) extending transversely of the panel generally tangentially to the forward edge of panel opening (16), and a pair of longitudinally extending ribs (56 and 58) laterally spaced from the upper panel opening (16); said cover including an upper wall adapter to seat upon the upper surface of the ribs (56, 58 and 64).

* * * * *